United States Patent [19]
Choi

[11] Patent Number: 5,473,483
[45] Date of Patent: Dec. 5, 1995

[54] DOUBLE MODE SWITCH DEVICE FOR MAGNETIC RECORDING AND REPRODUCING APPARATUS

[75] Inventor: Sung H. Choi, Kyungki, Rep. of Korea

[73] Assignee: Goldstar Co., Ltd., Seoul, Rep. of Korea

[21] Appl. No.: 395,650

[22] Filed: Feb. 28, 1995

Related U.S. Application Data

[63] Continuation of Ser. No. 76,151, Jun. 14, 1993, abandoned.

[30] Foreign Application Priority Data

Jun. 17, 1992 [KR] Rep. of Korea ................ 10503/1992

[51] Int. Cl.$^6$ .............................................. G11B 15/675
[52] U.S. Cl. ............................................................ 360/96.5
[58] Field of Search ............................... 360/96.5, 96.6, 360/84, 85, 98.06, 99.02, 99.03, 99.06, 99.07

[56] References Cited

U.S. PATENT DOCUMENTS 4,918,549  4/1990  Katono et al. ...................... 360/96.5

Primary Examiner—Robert S. Tupper

[57] ABSTRACT

A double mode switch device for carrying out a mode sensing operation and a cassette holder ejecting operation of magnetic recording and reproducing apparatus. The switch device includes a circuit board having a mode sensing pattern, a mode sensing gear rotatably mounted on the circuit board and having a mode sensing terminal and a cam slot, a cassette holder eject lever rotatably mounted on the circuit board such that it cooperates with the cam slot of the mode sensing gear to eject the cassette holder, and a mode sensing unit for sensing a mode switching operation in accordance with the rotation of the sensing gear and the eject lever. The mode sensing unit may include an eject sensing pattern of the circuit board and an eject sensing terminal provided on the eject lever to come into selective contact with the eject sensing pattern, or the unit my include a switch provided on the circuit board to cooperate with the eject lever.

8 Claims, 4 Drawing Sheets

DOUBLE MODE SWITCH DEVICE FOR MAGNETIC RECORDING AND REPRODUCING APPARATUS

This application is a divisional of application Ser. No. 08/076,151 filed on Jun. 14, 1993, now abandoned.

BACKGROUND OF THE INVENTION

1. Field of the Invention

The present invention relates to a mode switch device for a magnetic recording and reproducing apparatus such as a slide loading type camcorder, and more particularly to a mode switch device for a magnetic recording and reproducing apparatus, capable of having both the mode sensing function and the cassette holder ejecting function.

2. Description of the Prior Art

In conventional magnetic recording and reproducing apparatus employing a general slide loading system, there are provided a mode switch unit for sensing a mode of a tape cassette and a cassette holder ejecting unit for ejecting a cassette holder. These units are arranged separately from each other, to be driven individual driving sources.

As a result, wiring for connecting the units to a circuit board of the apparatus becomes complex, resulting in degradations in workability in assembling and productivity. Moreover, there is an increase in the manufacture cost, since a separate sensing device is required.

FIG. 1 is a perspective view of a deck mechanism employing conventional arrangements of a mode switch unit and cassette holder ejecting unit. In the drawing, the reference character A denotes the deck mechanism. Also, the reference numerals B and C denote a mode switch unit and a cassette holder ejecting unit, respectively.

As shown in FIG. 1, the mode switch unit B and the cassette holder ejecting unit C are disposed separately from each other so that the mode switch unit B performs only the mode sensing operation, while the cassette holder ejecting unit C is driven by a separate driving source, to release a locked state of its lock lever and thus eject a cassette holder associated therewith.

FIG. 2 is an exploded perspective view of the construction of the conventional mode switch unit. As shown in FIG. 2, the mode switch unit comprises a base plate 1 bearing a mode sensing pattern (not shown) and having a predetermined shape. Beneath the base plate 1, a sensing gear 2 is rotatably mounted, which is provided with a mode sensing brush 2a. Over the base plate 1, a holder 3 is also coupled to the base plate 1. The mode switch unit with the above-mentioned construction is arranged to be engaged with a loading gear (not shown) of the deck mechanism. As the loading gear rotates, the sensing gear rotates, so that the mode sensing brush 2a of sensing gear senses various mode operations while coming into contact with the mode sensing pattern of the base plate 1.

On the other hand, FIG. 3 is a perspective view of the conventional cassette holder ejecting unit. In FIG. 3, the reference numeral 4 denotes a main base, 4a a lock pin, 5 a cassette holder, 5a a lock lever, 6 a driving cam gear, 7 an eject lever, and 8 a sensing switch.

As shown in FIG. 3, the driving cam gear 6 and the eject lever 7 are disposed at one side portion of the main base 4, to be engaged with each other. Adjacent to the eject lever 7, the sensing switch 8 is positioned, which is adapted to sense an operation the cassette holder 5. The cassette holder 5 is locked at its closed state, when its lock lever 5a is engaged with the lock pin 4a of main base 4. In opening the cassette holder 5, the lock lever 5a is pushed in the direction indicated by the arrow of FIG. 3 by one end of the eject lever 7 which pivots according to a rotation of the driving cam gear 6. As a result, the lock lever 5a is disengaged from the lock pin 4a, thereby causing the cassette holder 5 to be opened.

In the conventional deck mechanism with the above-mentioned construction, since the mode switch unit and the cassette holder ejecting unit are arranged separately from each other, to be individually driven, the sensing switch operatively connected to the eject lever is arranged to be separated from the mode switch. Such an arrangement requires individual wirings for connecting the switches to the circuit board of apparatus, resulting in a complex wiring arrangement and an increase in number of constituting elements. Moreover, a separate sensing switch is also required. As a result, the overall construction becomes complex, resulting in degradations in workability in assembling and productivity and an increase in manufacture cost.

SUMMARY OF THE INVENTION

It is, therefore, an object of the present invention to provide a double mode switch device for a magnetic recording and reproducing apparatus in which the above disadvantages can be overcome and which carries out a mode sensing operation and a cassette holder ejecting operation of the deck mechanism of the apparatus.

To accomplish the above object, a double mode switch device according to the present invention comprises a circuit board having a mode sensing pattern, a mode sensing gear rotatably mounted on the circuit board and having a mode sensing terminal and means for driving an eject means, the eject means ejecting a cassette holder and rotatably mounted on the circuit board such that it cooperates with the driving means of the mode sensing gear to eject the cassette holder, and mode sensing means for sensing a mode switching operation in accordance with the rotation of the sensing gear and the operation of the eject means, a cam slot.

The driving means of the mode sensing gear comprises an annular cam slot provided on the lower surface of the sensing gear and has a rib for driving the eject means.

The cam slot is provided on its outer surface with a limit bulge for reducing the rotating angle of the eject means when an eject mode is achieved, thereby causing the cassette loading operation of the cassette holder to be achieved more easily.

In a primary embodiment, the mode sensing unit comprises an eject sensing pattern provided on the circuit board and an eject sensing terminal provided on the eject lever to come into selective contact with the eject sensing pattern.

In a second embodiment, the mode sensing unit comprise a switch provided on the circuit board to cooperate with the eject lever.

The eject means comprises an eject lever adapted for ejecting the cassette holder and rotated as a result of cooperation with the driving means of the mode sensing gear, and a lock lever mounted on a side of the cassette holder and cooperating with the eject lever.

The eject lever is biased by a biasing member in a predetermined direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
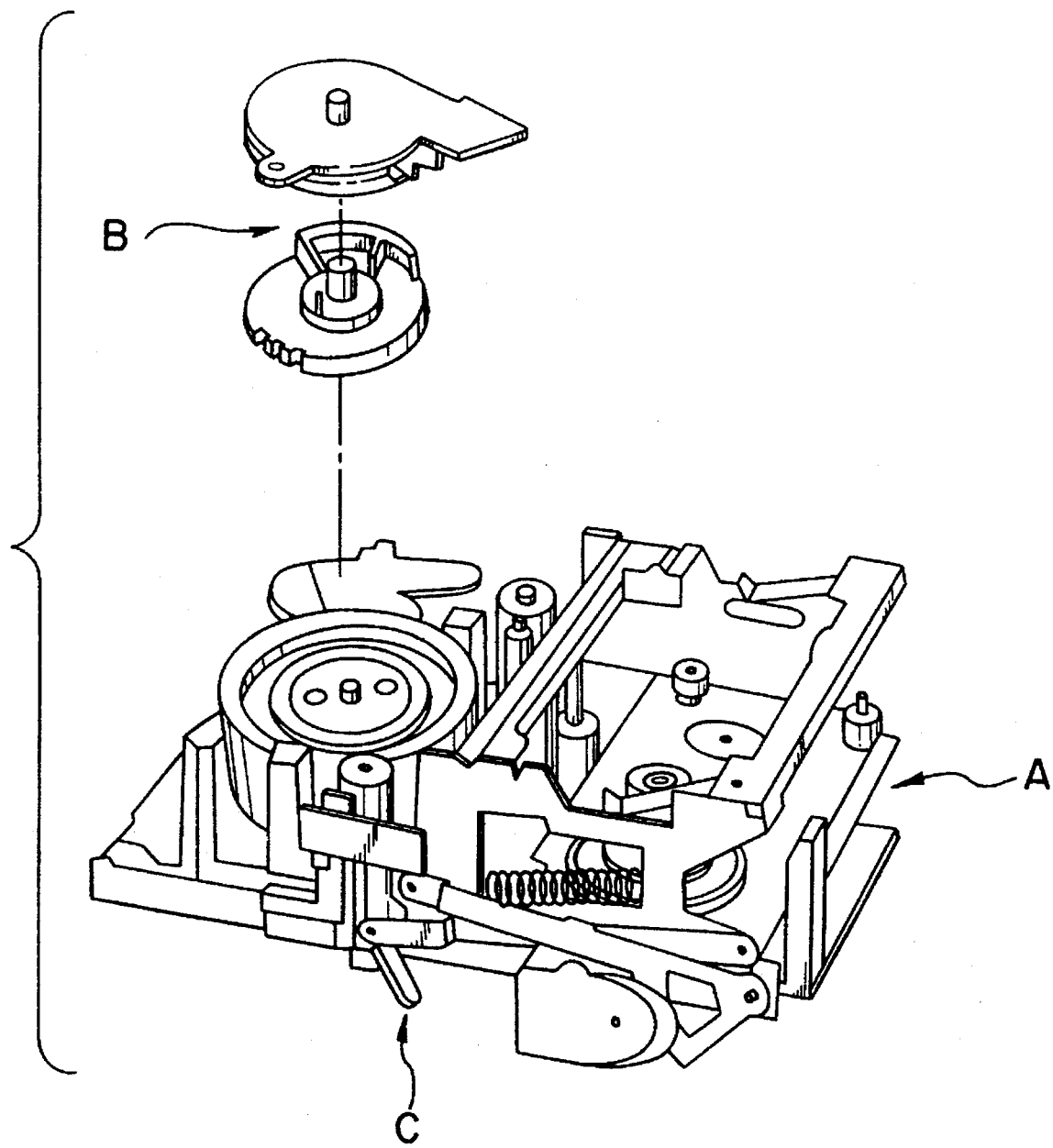
FIG. 1 is a perspective view of a deck mechanism employing conventional arrangements of mode switch unit and cassette holder ejecting unit.
Figure 2:
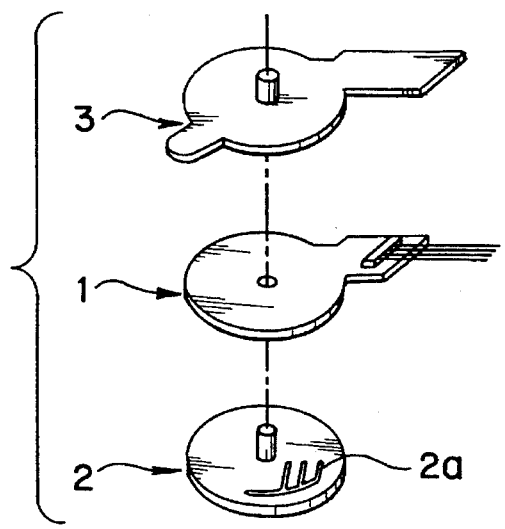
FIG. 2 is an exploded perspective view of the construction of the conventional mode switch unit.
Figure 3:
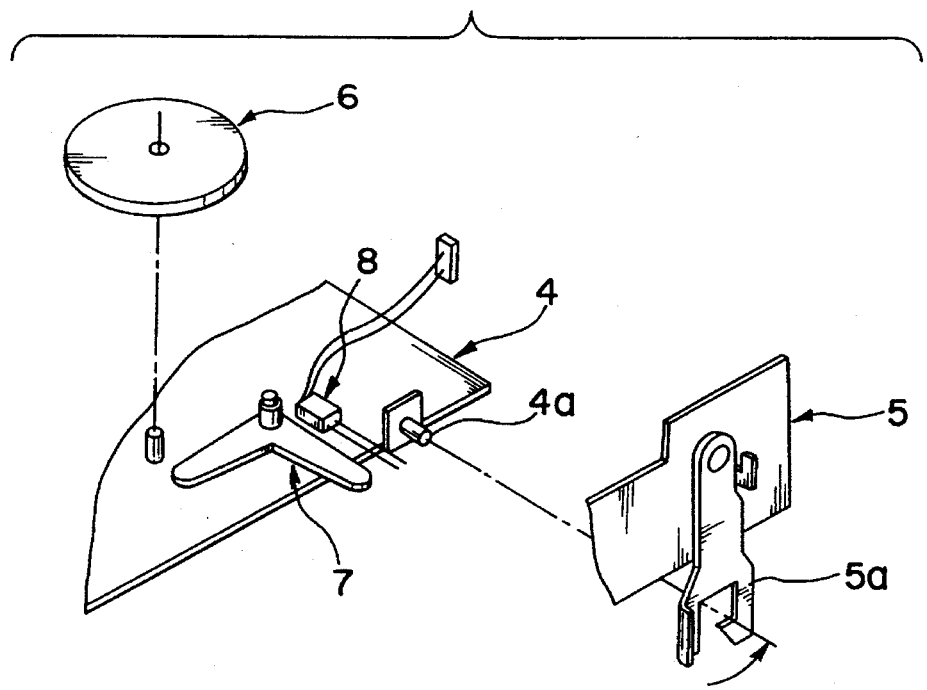
FIG. 3 is a perspective view of the conventional cassette holder ejecting unit.
Figure 4:
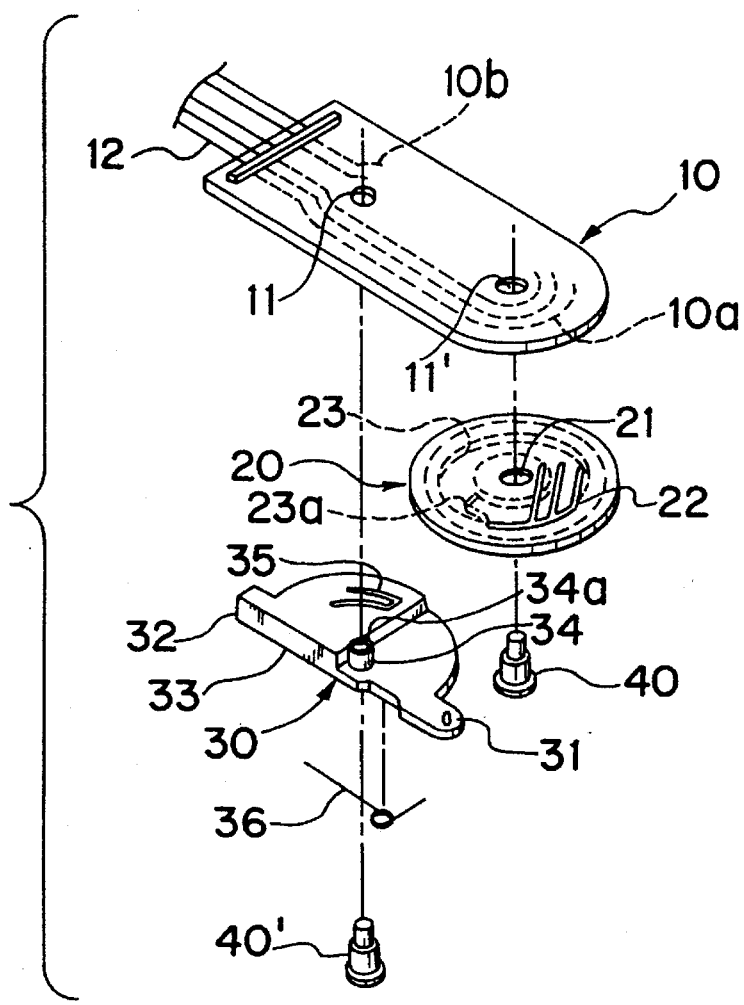
FIG. 4 is an exploded perspective view of a double mode switch device in accordance with a primary embodiment of the present invention.
Figure 5:
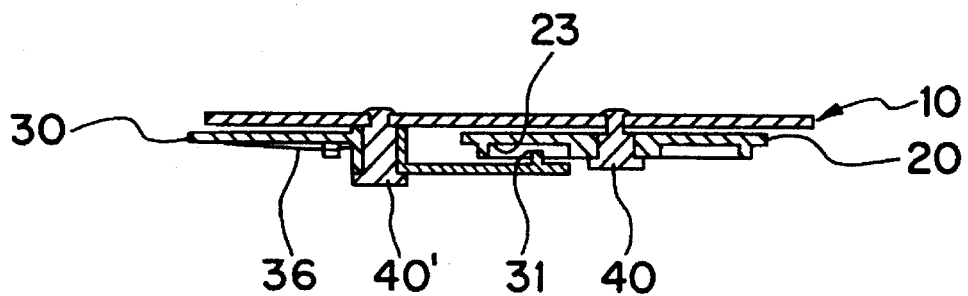
FIG. 5 is a sectional view of the assembled double mode switch device according to the primary embodiment of the present invention.

With reference to FIGS. 4 and 5, there is shown a double mode switch device in accordance with a primary embodiment of the present invention. The double mode switch device comprises a sensing gear 20 and an eject lever 30 which are rotatably mounted on a circuit board 10, having a mode sensing pattern 10a and an eject sensing pattern 10b, by individual shaft pins 40 and 40'. The sensing gear 20 is rotated by a rotational force of an additional drive unit, while the eject lever 30 cooperates with the sensing gear 20 to be rotated.

The circuit board 10 is provided with a pair of hinge holes 11 and 11' which are spaced apart from each other by a predetermined distance and receive the shaft pins 40 and 40', respectively. A plurality of electric wires 12 are connected to an end of the circuit board 10.

The sensing gear 20 is provided at its center with a shaft hole 21, at an end thereof with a mode sensing terminal 22 which comes into selective contact with the sensing pattern 10a of the board 10. The sensing gear 20 is also provided on its lower surface with a cam slot 23 which has a curved rib 23a for operating the eject lever 30.

In addition, the eject lever 30 is provided at an end thereof with a drive protrusion 31 which comes into contact with inner and outer surfaces 23b and 23c of the cam slot 23 of the sensing gear 20. The eject lever 30 further includes a fixing boss 34 which has a shaft hole 34a and upwardly protrudes from the upper surface of a lever body 33 provided with a protrusion 32 for releasing a lock lever of a cassette holder (not shown) of the cassette housing. An eject sensing terminal 35 is provided on the upper surface of the lever body 33 of the eject lever 30 and comes into selective contact with the eject sensing pattern 10b of the circuit board 10. The eject lever 30 is rotated as a result of cooperation with the sensing gear 20 and normally biased by a torsion spring 30 clockwise.

Figure 6:
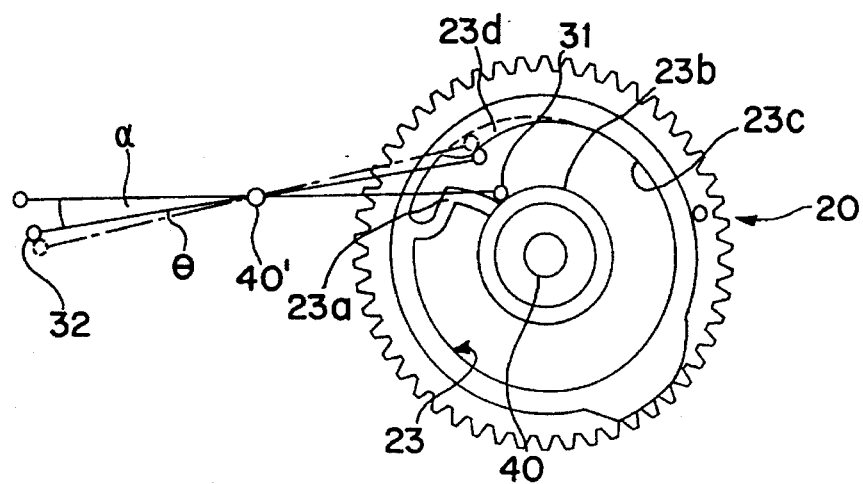
FIG. 6 is a plan view of a mode sensing gear of the double mode switch device of this invention showing the interrelation between a cam slot of the mode sensing gear and a drive protrusion of an eject lever.

The cam slot 23 of the sensing gear 20 further includes an eject lever limit bulge 23d which is provided at a section of the outer surface 23c as shown in FIG. 6 to limit the rotating angle of the eject lever 30 when the eject mode is achieved. Due to the limit bulge 23d of the cam slot 23, the cassette loading operation of the cassette holder is achieved more easily as described hereinbelow.

As shown in FIG. (in order to prevent the interference of the drive protrusion 31 of the eject lever 30, operated by the curved rib 23a of the cam slot 23, with the outer surface 23c of the cam slot 23, the outer surface 23c of the cam slot 23 has such a shape that the interval between the outer surface 23c and the inner surface 23b becomes larger to the section near the curved rib 23a. Thus, the rotating angle $\alpha$ of the eject lever 30 becomes larger as shown at the dash and dot line of FIG. 6, thereby resulting in a problem in that the desired smooth operation of the cassette holder is not achieved. In order to remove such a problem, the cam slot 23 of this invention is provided with the eject lever limit bulge 23d at a section of its outer surface 23c, for example, at the section with which the drive protrusion 31 of the eject lever 30 comes into contact at the initial stage of the eject lever driving operation. Thus, the eject lever 30 is initially located on the solid line of FIG. 6, thereby reducing the rotating angle $\alpha$ of the eject lever 30 by an angle of $\Theta$. In this regard, the cassette loading operation of the cassette holder is achieved more easily.

The double mode switch device of the present invention is mounted on a conventional slide loading type deck mechanism such that the sensing gear 20 of the switch device gears with a loading gear of the deck mechanism. In addition, the releasing protrusion 32 of the eject lever, 30 of this device should cooperate with the lock lever of the cassette holder of the deck mechanism. Hence, the double mode switch device of this invention carries out a mode sensing operation as well as the cassette holder ejecting operation.

In operation, when the cassette holder of the deck mechanism is pressed down to load the tape cassette, the lock lever of the cassette holder pushes the releasing protrusion 32 of the eject lever 30. The eject lever 30 is thus rotated clockwise about the shaft pin 40' while overcoming the spring force of the torsion spring 36. Such a clockwise rotation of the eject lever 30 causes the eject sensing terminal 35 of the eject lever 30 to come into contact with the eject sensing pattern 10b of the circuit board 10, thereby causing a switch operation. Thus, it is sensed the cassette loading state and this allows a desired mode to be performed.

At this time, a variety of mode states are sensed by the contact of the mode sensing terminal 22 of the sensing gear 20 with the mode sensing pattern 10a of the circuit board 10 caused by the rotation of the sensing gear 20. The drive protrusion 31 of the eject lever 30 is located on the inner surface 23b of the cam slot 23 of the sensing gear 20.

When a present mode is changed into the eject mode, the sensing gear 20 is rotated clockwise by the rotational force of the loading gear, so that the drive protrusion 31 of the eject lever 30 located on the inner surface 23b of the cam slot 23 is pushed by the curved rib 23a of the cam slot 23. Thus, the eject lever 30 is rotated counterclockwise about the shaft pin 40'. Such a counterclockwise rotation of the eject lever 30 causes its releasing protrusion 32 to push the lock lever of the cassette holder, so that the cassette holder is freed from the lock pin of the main base of the deck mechanism. The cassette holder is thus opened by the restoring force of spring means for opening the cassette holder. At the same time, the sensing gear 20 is rotated counterclockwise to finish the eject mode under the condition that the drive protrusion 31 of the eject lever 30 is located on the outer surface 23c of the cam slot 23.

At this time, the eject sensing terminal 35 of the eject lever 30 is separated from the eject sensing pattern 10b of the circuit board 10, thereby sensing that there is no tape cassette in the deck mechanism. The eject lever 30 maintains its rotatable state waiting for the cassette loading operation.

As described above, the double mode switch device of the present invention carries out the mode sensing operation as well as the cassette holder ejecting operation by making an eject lever cooperate with a cam slot of a sensing gear. Thus, the double mode switch device of this invention reduces the number of elements and simplifies the construction, such as by simplifying the wiring, thereby improving the assembly ability as well as productivity. An eject lever limit bulge is provided on the outer surface of the cam slot of the sensing gear to reduce the rotating angle of the eject lever, thus causing the cassette loading operation of the cassette holder to be achieved more easily.

Figure 7:
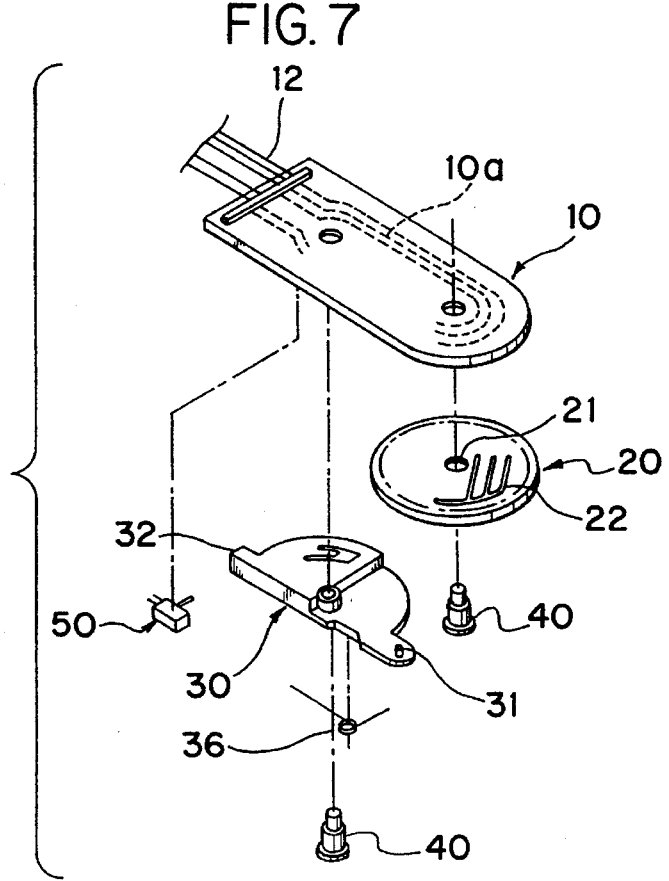
FIG. 7 is an exploded perspective view of a double mode switch device in accordance with a second embodiment of the present invention.

Referring to FIG. 7, there is shown a double mode switch device in accordance with a second embodiment of the present invention. In the second embodiment, the general shape of the device remains the same as in the primary embodiment of FIG. 4, but the circuit board 10 is provided at an end thereof with a switch 50 used as mode sensing means for sensing the switching operation carried out by the movement of the cassette holder. This second embodiment yields the same result as that described for the primary embodiment, thus further explanation is not deemed necessary.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cassette holder eject device for a magnetic recording and reproducing apparatus comprising:

a mode switch circuit board including a stationary mode sensing part;

an eject sensing means, provided at one side of said mode switch circuit board, for sensing an eject state of said cassette holder;

a movable mode sensing means for sensing a mode of said magnetic recording and reproducing apparatus, rotatably mounted on said mode switch circuit board and having a mode sensing terminal which opposes said stationary mode sensing part of said mode switch circuit board and an operating part on an opposite side of said movable mode sensing means as said mode sensing terminal;

a locking means for maintaining a loading state of the cassette holder; and eject means for ejecting said cassette holder by engaging said locking means, said eject means having an eject sensing terminal which communicates with the eject sensing means and connected to said operating part of the movable mode sensing means so as to rotate in accordance with rotation of said operating part of the movable mode sensing means, wherein said eject means is operated in accordance with the operating part of the moveable mode sensing means and carries out a releasing operation for releasing a locking state of the cassette holder by operating the locking means as well as performing a sensing operation for sensing an eject state by communicating with the eject sensing means.

2. The cassette holder eject device according to claim 1, wherein said movable mode sensing means comprises an annular cam slot provided on a surface of said sensing means, said annular cam slot includes a rib for driving the eject means, said rib being provided between an inner surface and an outer surface of said cam slot.

3. The cassette holder eject device according to claim 2, wherein said annular cam slot is provided on said outer surface with a limit bulge for reducing a rotation angle of said eject means when an eject mode is achieved wherein said operating part of said movable mode sensing means is in a predetermined rotational position.

4. The cassette holder eject device according to claim 1, wherein said eject means includes:

an eject lever for ejecting said cassette holder, said eject lever being rotated as a result of cooperation with said operating part of the movable mode sensing means.

5. The cassette holder eject device according to claim 4, wherein said eject lever is biased by a biasing member in a predetermined direction.

6. The cassette holder eject device according to claim 1, wherein said mode sensing means comprises:

an eject sensing pattern provided at a side section of the circuit board; and an eject sensing terminal provided on said eject means to come into selective contact with said eject sensing pattern.

7. The cassette holder eject device according to claim 1, wherein said mode sensing means comprises a switch provided on said circuit board and cooperating with said eject means.

8. A cassette holder eject device for a magnetic recording and reproducing apparatus comprising:

a mode switch circuit board including a stationary mode sensing circuit pattern and an eject sensing circuit pattern provided on one surface of said mode switch circuit board;

a mode sensing gear rotatably mounted directly on said mode switch circuit board and having a mode sensing terminal on one surface of said mode sensing gear which opposes said stationary mode sensing circuit pattern of said mode switch circuit board and a cam slot on a second surface of said mode sensing gear;

locking means for maintaining a cassette holder in a loaded state; and an eject lever, pivotably mounted directly on said mode switch circuit board having an eject sensing terminal which opposes said eject sensing circuit pattern on said mode switch circuit board and a protrusion which engages said cam slot of the mode sensing gear so as to pivot in accordance with rotation of said mode sensing gear, wherein when said eject lever is pivoted in accordance with rotation of the cam slot of the mode sensing gear a releasing operation for releasing a locking state of the cassette holder is carried out by an engagement between said eject lever and said locking means as well as performing an eject sensing operation for sensing an eject state of said eject lever through a communication between the eject sensing terminal and said eject sensing circuit pattern.

* * * * *